(12) United States Patent
Heo

(10) Patent No.: US 11,984,565 B2
(45) Date of Patent: May 14, 2024

(54) MOBILE ESS DEVICE

(71) Applicant: aeonus Co., Ltd, Suwon-si (KR)

(72) Inventor: Eun Heo, Yongin-si (KR)

(73) Assignee: aeonus Co., Ltd, Suwon-si (KR)

( * ) Notice: Subject to any disclaimer, the term of this patent is extended or adjusted under 35 U.S.C. 154(b) by 0 days.

(21) Appl. No.: 17/989,031

(22) Filed: Nov. 17, 2022

(65) Prior Publication Data

US 2024/0097211 A1 Mar. 21, 2024

(30) Foreign Application Priority Data

Sep. 15, 2022 (KR) ........................ 10-2022-0115987

(51) Int. Cl.
*H01M 10/04* (2006.01)
*H01M 10/42* (2006.01)
(Continued)

(52) U.S. Cl.
CPC ....... *H01M 10/425* (2013.01); *H01M 10/482* (2013.01); *H01M 50/204* (2021.01);
(Continued)

(58) Field of Classification Search
CPC ............. H01M 10/425; H01M 10/482; H01M 50/204; H01M 50/249; H01M 2220/20;
(Continued)

(56) References Cited

U.S. PATENT DOCUMENTS

| | | | | |
|---|---|---|---|---|
| 4,008,356 | A * | 2/1977 | Asano | H01M 50/204 439/387 |
| 8,999,557 | B2 * | 4/2015 | Kim | H01M 50/289 429/157 |

(Continued)

FOREIGN PATENT DOCUMENTS

| | | |
|---|---|---|
| KR | 102239780 B1 | 4/2021 |
| KR | 102293077 B1 | 8/2021 |

(Continued)

*Primary Examiner* — Michael L Dignan
(74) *Attorney, Agent, or Firm* — NKL Law; Jae Youn Kim

(57) ABSTRACT

The embodiments of the present disclosure relate to an energy storage system (ESS) device that can be used for a moving means such as a construction machine and an electric vehicle, and is configured so that multiple battery packs can be detached to increase a management efficiency of the battery pack.

According to embodiment, there is provided a mobile ESS device including a battery pack case electrically connected to a control device of a moving means and installed in the moving means; a battery pack accommodated in the battery pack case and electrically connected to the battery pack case; at least one sensor module disposed in at least one of the battery pack and the battery pack case to sense an electrical state and an environmental state of the battery pack; and a controller accommodated in the battery pack case and electrically connected to the sensor module and the battery pack to monitor and control a state of the battery pack, wherein the controller receives movement information related to movement from the control device of the movement means, controls the sensor module based on the reception of the movement information, and controls the battery pack using the movement information and sensing information sensed by the sensor module.

1 Claim, 3 Drawing Sheets

(51) Int. Cl.
*H01M 10/48* (2006.01)
*H01M 50/204* (2021.01)
*H01M 50/249* (2021.01)
*H02J 7/00* (2006.01)
*B60L 50/60* (2019.01)

(52) U.S. Cl.
CPC ......... *H01M 50/249* (2021.01); *H02J 7/0013* (2013.01); *H02J 7/0032* (2013.01); *H02J 7/0047* (2013.01); *H02J 7/0063* (2013.01); *H02J 7/007* (2013.01); *B60L 50/60* (2019.02); *H01M 2220/20* (2013.01)

(58) Field of Classification Search
CPC ...... H02J 7/0013; H02J 7/0032; H02J 7/0047; H02J 7/0063; H02J 7/007; B60L 50/60
See application file for complete search history.

(56) References Cited

U.S. PATENT DOCUMENTS

| | | | |
|---|---|---|---|
| 9,193,277 B1* | 11/2015 | Penilla | B60L 53/305 |
| 9,592,742 B1* | 3/2017 | Sosinov | B60L 53/68 |
| 2003/0162091 A1* | 8/2003 | Watanabe | H01M 50/124 |
| | | | 429/156 |
| 2012/0328926 A1* | 12/2012 | Tai | H01M 50/262 |
| | | | 429/100 |
| 2014/0199570 A1* | 7/2014 | Cho | H01M 10/488 |
| | | | 429/93 |
| 2018/0264955 A1* | 9/2018 | Gupta | G06Q 30/0283 |
| 2021/0016649 A1* | 1/2021 | Sasmaz | H01M 50/209 |

FOREIGN PATENT DOCUMENTS

| | | |
|---|---|---|
| KR | 102378188 B1 | 3/2022 |
| KR | 20220061307 A | 5/2022 |

* cited by examiner

MOBILE ESS DEVICE

CROSS-REFERENCE TO RELATED APPLICATION

This application claims priority to Korean Patent Application No. 10-2022-0115987 filed on Sep. 15, 2022, and all the benefits accruing therefrom under 35 U.S.C. § 119, the contents of which are incorporated by reference in their entirety.

BACKGROUND

The following embodiments relate to an energy storage system (ESS) device that can be used for a moving means such as a construction machine and an electric vehicle, is configured so that multiple battery packs can be detached, and includes a controller capable of controlling the sensitivity or monitoring of a sensing module, connection/linking between the battery pack and a battery of the moving means, etc. according to movement information and sensing information to increase a management efficiency of the battery pack.

The energy storage system (ESS) is a system that stores energy using a device or a physical medium, and can be installed and operated in a power system, and is being used for frequency adjustment, stabilization of new and renewable generator output, peak load reduction, load leveling, emergency power, etc.

The energy storage system can improve energy use efficiency by storing energy when using less electric energy and supplying energy when electric energy is needed, and can contribute to the stabilization of a power supply system.

The energy storage system can use vehicle to grid (V2G), vehicle to home, (V2H) and vehicle to building (V2B) technologies to efficiently operate low-cost energy.

V2G, V2H, and V2B are to supply electricity stored in an electric vehicle battery to batteries in a power system, home, and building, and can use bi-directional charging technology.

The energy storage system can collect a large amount of power by collecting power from a large number of electric vehicles, and can play a major role in cost reduction because it uses the surplus power remaining by charging power when the cost of power is low. However, since the capacity of the battery used in the electric vehicle is far insufficient, it is difficult to actually implement the energy storage system.

In addition, since the moving means for transporting the battery pack is also a device that requires electric energy, a more efficient management system is required, and the demand for a system capable of easily attaching and detaching and charging/connecting a plurality of battery packs is increasing.

PRIOR ART LITERATURE

Patent Literature (PTL 1) KR 10-2239780 B
(PTL 2) KR 10-2293077 B

SUMMARY

The embodiment of the present disclosure provides a mobile ESS device that can control the ESS by being closely linked to the moving means that transports the battery pack, and can detach the battery pack more easily in order to overcome the limitations of a conventional energy storage system (ESS).

In accordance with an exemplary embodiment of the present invention, there is provided a mobile ESS device including a battery pack case electrically connected to a control device of a moving means and installed in the moving means, a battery pack accommodated in the battery pack case and electrically connected to the battery pack case, at least one sensor module disposed in at least one of the battery pack and the battery pack case to sense an electrical state and an environmental state of the battery pack, and a controller accommodated in the battery pack case and electrically connected to the sensor module and the battery pack to monitor and control a state of the battery pack, in which the controller receives movement information related to movement from the control device of the moving means, controls the sensor module based on the reception of the movement information, and control the battery pack using the movement information and sensing information sensed by the sensor module.

In addition, the battery pack case may further include a guide rail electrically connected to a battery included in the moving means and extending in one direction, the controller may use the movement information and the sensing information to control power of the battery pack to be supplied to the moving means, to control power of the battery of the moving means to be supplied to the battery pack, or to control the power of the battery of the moving means and the power of the battery pack to be supplied to an external device, and the battery pack may be configured to further include a guide inserted into the guide rail and a moving jig connected to transportation equipment to move the battery pack along the guide rail such that when the guide of the battery pack is fixed by being moved along the guide rail, a first connection part of the battery pack is electrically connected to a second connection part of the battery pack case.

Further, the battery pack case may include an opening and closing door configured to open and close both sides thereof, an insertion port formed at one end of the guide rail and opened so that the guide is insertable and removable, a blocking wall formed at the other end of the guide rail and closed so that the guide is not removed, a plurality of seating grooves formed under the guide rail to provide a space in which the battery pack is seated, a support plate disposed under the seating groove and connected to be movable up and down so that the battery pack is able to pass through without being caught in the seating groove while the battery pack is being moved, and a spring connected to a lower portion of the support plate and provided so as to seat the battery pack in the seating groove by being compressed by a load of the one battery pack, and the support plate may include a first support plate closest to the blocking wall among a plurality of support plates, a third support plate closest to the insertion port among the plurality of support plates, and at least one second support plate disposed between the first support plate and the third support plate, and at least one second support plate may be configured to be disposed so that parts of the first support plate, the at least one second support plate and the third support plate are sequentially stacked one by one in an order from the first support plate to the third support plate.

Further, the battery pack case may include a pair of fork rails which is formed under the guide rail, extends in a direction parallel to the guide rail, and into which a fork of a forklift is able to be inserted, a seating guide projection formed under the fork rail, protruding downward in a 'V' shape, and extending in a direction parallel to the fork rail, and a first seating guide groove formed on an upper portion of the battery pack case and formed in a shape corresponding to the seating guide projection to provide a space in which the seating guide projection is seated when the battery pack case is stacked in two or more layers, and the battery pack case may be configured such that when the seating guide projection is seated in a second seating guide groove formed on a loading table of the moving means, a third connection part of the battery pack case and a fourth connection part of the moving means are electrically connected, and the third connection part is formed at a tip portion of the 'V' shape of the seating guide projection, and the fourth connection part is formed on a valley portion of a 'V' shape of the second seating guide groove.

Further, the moving jig may include a hook configured to be detachably attached to a belt connection hole formed on one side of the battery pack and fastened to the transportation equipment, and a belt of which one end is connected to the hook and which extends, and the hook may include a branching part that is bifurcated and spreads by its own elasticity, a fitting ring fitted to the branching part so that the branching part is closed to surround the handle bar, an elastic body extending from the branching part, external tongs formed at end portions of the elastic body to surround the handle bar, a rail part formed so as to be penetrated through the elastic body to have a predetermined length, a slide part connected to the rail part so as to be slidably movable, internal tongs connected to the slide part to slide in the longitudinal direction of the elastic body, and a pair of magnets that have different poles and are coupled to end portions of the inner tongs so that attractive forces act.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
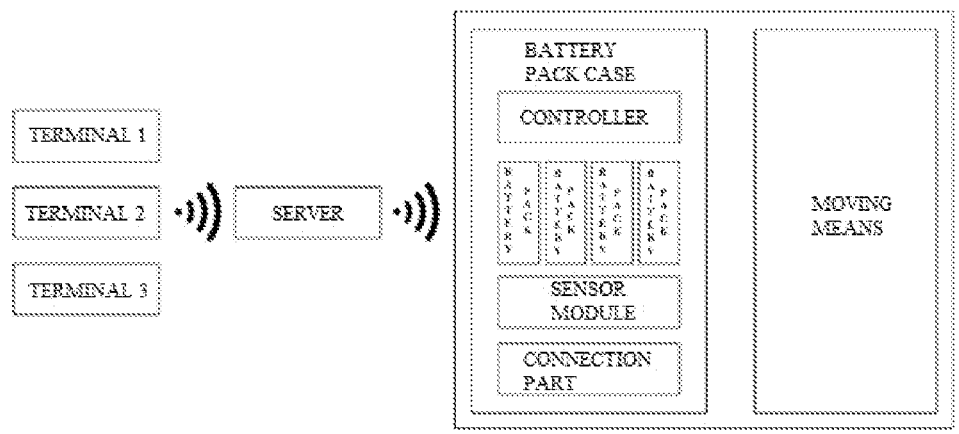
FIG. 1 is a schematic diagram illustrating a mobile ESS device in accordance with an embodiment of the present invention.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of layers and regions are exaggerated for clarity of illustration. Like reference numerals refer to like elements throughout. It will also be understood that when a layer, a film, a region or a plate is referred to as being 'on' another one, it can be directly on the other one, or one or more intervening layers, films, regions or plates may also be present. Further, it will be understood that when a layer, a film, a region or a plate is referred to as being 'under' another one, it can be directly under the other one, and one or more intervening layers, films, regions or plates may also be present. In addition, it will also be understood that when a layer, a film, a region or a plate is referred to as being 'between' two layers, films, regions or plates, it can be the only layer, film, region or plate between the two layers, films, regions or plates, or one or more intervening layers, films, regions or plates may also be present.

Hereinafter, embodiments will be described in detail with reference to the accompanying drawings. However, since various modifications may be made to the embodiments, the scope of the patent application is not limited or restricted by these embodiments. It should be understood that all modifications, equivalents and substitutes for the embodiments are included in the scope of the rights.

Specific structural or functional descriptions of the embodiments are disclosed for purposes of illustration only, and may be changed and implemented in various forms. Accordingly, the embodiments are not limited to a specific disclosure form, and the scope of the present specification includes modifications, equivalents, or substitutes included in the technical spirit.

Terms such as first or second may be used to describe various components, but these terms should be interpreted only for the purpose of distinguishing one component from another component. For example, a first component may be referred to as a second component, and similarly, the second component may also be referred to as the first component.

When a component is referred to as being "coupled to" another component, it may be directly coupled or connected to the other component, but it should be understood that another component may exist in between.

The terms used in the embodiments are used for description purposes only, and should not be interpreted as limiting. The singular expression includes the plural expression unless the context clearly dictates otherwise. In the present specification, it should be understood that terms such as "comprise" or "include" are intended to designate that a feature, number, step, operation, component, part, or combination thereof described in the specification exists, but does not preclude the possibility of the presence or addition of one or more other features or numbers, steps, operations, components, parts, or combinations thereof.

Unless otherwise defined, all terms used herein, including technical or scientific terms, have the same meaning as commonly understood by one of ordinary skill in the art to which the embodiment belongs. Terms such as those defined in commonly used dictionaries should be interpreted as having a meaning consistent with the meaning in the context of the related art, and should not be interpreted in an ideal or excessively formal meaning unless explicitly defined in the present application.

Further, in describing the embodiments with reference to the accompanying drawings, the same components are given the same reference numerals regardless of the signs on the drawings, and redundant descriptions thereof will be omitted. In describing the embodiments, when it is determined that a detailed description of a related known technology may unnecessarily obscure the gist of embodiments, a detailed description thereof will be omitted.

Advantages and features of the present invention and methods of achieving them will become apparent with reference to the embodiments described below in detail in conjunction with the accompanying drawings. However, the present invention is not limited to the embodiments disclosed below, but will be implemented in various different forms, and only these embodiments are provided so that the disclosure of the present invention is complete, and to completely inform the scope of the invention to those of ordinary skill in the art to which the present invention belongs, and the present invention is only defined by the scope of the claims.

In the embodiments of the present invention, unless otherwise defined, all terms used herein, including technical or scientific terms, have the same meaning as those commonly understood by a person ordinary skilled in the art to which this invention belongs. Terms such as those defined in a commonly used dictionary should be interpreted as having a meaning consistent with the meaning in the context of the related art, and are not to be construed in an ideal or overly formal meaning unless explicitly defined in the embodiments of the present invention.

The shape, size, proportion, angles, number, etc. disclosed in the drawings for describing the embodiments of the present invention are illustrative and thus the present invention is not limited to the illustrated matters. In addition, in describing the present invention, if it is determined that a detailed description of a related known technology may unnecessarily obscure the subject matter of the present invention, the detailed description thereof will be omitted. When 'include', 'having', 'composed of', etc. mentioned in this specification are used, other parts may be added unless 'only' is used. When a component is expressed in the singular, the case in which a plurality of components are included is included unless specifically stated otherwise.

In interpreting the component, it is interpreted as including an error range even if there is no separate explicit description.

In the case of a description of the positional relationship, for example, a positional relationship between two parts is When described, one or more other parts may be placed between the two parts unless 'immediately' or 'directly' is used.

The size and thickness of each component shown in the drawings are illustrated for convenience of explanation, and the present invention is not necessarily limited to the size and thickness of the illustrated component.

Each feature of the various embodiments of the present invention may be partially or wholly coupled or combined with each other, technically various linking and driving are possible as will be fully understood by those skilled in the art, and may be implemented independently of each other or may be implemented together in a related relationship.

In accordance with an exemplary embodiment of the present invention, there is provided a mobile ESS device including a battery pack case electrically connected to a control device of a moving means and installed in the moving means, a battery pack accommodated in the battery pack case and electrically connected to the battery pack case, at least one sensor module disposed in at least one of the battery pack and the battery pack case to sense an electrical state and an environmental state of the battery pack, and a controller accommodated in the battery pack case and electrically connected to the sensor module and the battery pack to monitor and control a state of the battery pack, in which the controller receives movement information related to movement from the control device of the moving means, controls the sensor module based on the reception of the movement information, and controls the battery pack using the movement information and sensing information sensed by the sensor module.

The controller may be communicatively connected to a predetermined server, and the server may be communicatively connected to at least one or more terminal devices. According to this configuration, it is possible to monitor and manage a plurality of mobile ESS devices from terminal devices.

The moving means may mean equipment/devices operated by predetermined electricity, such as construction machines, trucks, passenger cars, vans, and buses. In this case, in order for the battery pack case to be installed in the moving means, a predetermined loading box/loading table should be provided in the moving means.

The battery pack case is electrically connected to the control device of the moving means, such that a driver of the moving means can operate the battery pack case (controller).

The battery pack case may be configured such that a predetermined space is provided therein and at least one battery pack is detachable.

The electrical state of the battery pack may mean a remaining battery amount, voltage, current, electrical performance values, etc., and the environmental state thereof may mean environmental requirements around the battery pack, such as temperature and humidity.

The movement information may include information that is controllable or collected by the control device of the moving means, such as the speed, front camera, current position, temperature and humidity inside the vehicle, temperature and humidity outside the vehicle, driving path, coolant temperature, tire pressure, etc. of the moving means.

The sensing information may include information, such as the speed and acceleration of the moving means, the electrical state of the battery pack, and the environmental state of the battery pack, collected by a sensor that operates independently of the control device of the moving means and is accommodated in the battery pack or battery pack case.

The description of 'control the battery pack using the movement information and the sensing information sensed by the sensor module' may mean that a certain battery pack can be selectively used (On; connected to the moving means to supply power to the moving means) or not used (Off) and/or monitoring can be started (On) or stopped (Off) according to predetermined information. In addition, the sensitivity of each sensor module may be set differently according to predetermined information.

For example, monitoring may be started through the sensor when the moving means starts, and monitoring may be stopped when the moving means is stopped). In addition, the sensitivity of a sensor related to a temperature of vehicle collision situation occurrence (or when the possibility of a vehicle collision is high) or a sensor related to the impact may be set differently.

The configuration of the electrical circuit for this purpose is a well-known area, and thus a detailed description will be omitted.

In addition, the battery pack case further includes a guide rail 1 electrically connected to a battery included in the moving means and extending in one direction, the controller uses the movement information and the sensing information to control power of the battery pack to be supplied to the moving means, to control power of the battery of the moving means to be supplied to the battery pack, or to control the power of the battery of the moving means and the power of the battery pack to be supplied to an external device, and the battery pack is configured to further include a guide inserted into the guide rail 1 and a moving jig connected to transportation equipment to move the battery pack along the guide rail such that when the guide of the battery pack is fixed by being moved along the guide rail 1, a first connection part of the battery pack is electrically connected to a second connection part of the battery pack case.

The battery pack can be electrically connected to the battery of the moving means by being fastened to the guide rail 1, and accordingly, the battery of the moving means may be replaced or used in combination with the battery pack.

The 'one direction' in which the guide rail 1 extends may be a direction perpendicular to a direction in which the front of the vehicle faces. For example, when the moving means is in the form of a truck, the guide rail 1 may be disposed in a form extending from one side of the truck to the other side.

The controller may charge the battery pack with the battery of the moving means when an amount of electric energy of the battery of the moving means is greater than (when the extra energy is sufficient) an amount of electric energy until arrival based on a path until the moving means arrives at the destination. Through this configuration, management efficiency can be improved by operating the vehicle/transport system in the form of supplying the battery pack that has been transported to the destination directly to customers or demanding places and charging the battery of the moving means at the destination.

Alternatively, electricity can be supplied to an 'external device' that requires a certain amount of power, such as a construction machine, to be operated.

The battery pack may be fastened such that a guide portion is inserted through one side of the guide rail 1 to be movable in one axial direction along the guide rail 1. The fastened battery pack may be fixed to or released from one side of the guide rail 1. The fixed battery pack (the state in which the first connection part and the second connection part are connected) may be connected to the battery, etc. of the moving means through the battery pack case.

Further, the battery pack case includes an opening and closing door configured to open and close both sides thereof, an insertion port 12 formed at one end of the guide rail 1 and opened so that the guide is insertable and removable, a blocking wall 11 formed at the other end of the guide rail 1 and closed so that the guide is not removed, a plurality of seating grooves formed under the guide rail 1 to provide a space in which the battery pack is seated, a support plate disposed under the seating groove and connected to be movable up and down so that the battery pack is able to pass through without being caught in the seating groove while the battery pack is moving; and a spring 14 connected to a lower portion of the support plate and provided so as to seat the battery pack in the seating groove by being compressed by a load of the one battery pack, and the support plate includes a first support plate 131 closest to the blocking wall 11 among a plurality of support plates, a third support plate 133 closest to the insertion port 12 among the plurality of support plates, and at least one second support plate 1132 disposed between the first support plate 131 and the third support plate 133, and is configured to be disposed so that parts of the first support plate 131, the at least one second support plate 132 and the third support plate 133 are sequentially stacked one by one in an order from the first support plate 131 to the third support plate 133.

The opening/closing door is opened when the battery pack is inserted/removed, and is closed when the moving means is operated, thereby capable of preventing foreign substances from entering the battery pack case.

The insertion port 12 is disposed on one side when the moving means is in the form of a truck, so that the battery pack can be more easily inserted/removed using a forklift, and the blocking wall 11 may perform a function of blocking the battery pack from penetrating through the truck (battery pack case) to the opposite side even if there is a blind spot invisible to the view of a forklift driver who inserts/removes the battery pack.

The seating groove functions so that the battery pack moving (pushed by the force of a forklift) along a seating rail can be seated below a path of the seating rail by a predetermined height due to its own weight, etc.

In this case, since the support plate blocks the seating groove until the battery pack is seated in the innermost seating groove (closest to the blocking wall 11), the battery pack can move smoothly without being caught in the seating groove while the battery pack is moving. In this case since the second support plate 132 and the third support plate 133 are supported by two springs 14, they are not (almost) compressed by the load of the battery pack.

When the battery pack is positioned in the innermost seating groove (closest to the blocking wall 11), the spring 14 is compressed and the first support plate 131 moves downward so that the battery pack is seated in the seating groove, and accordingly, the second support plate 132 disposed in the next seating groove is supported only by one spring 14.

When the second battery pack is positioned at the position of the second support plate 132 supported only by one spring 14 as described above, the spring 14 is compressed and the second battery pack is seated in the second seating groove. In this case, the second support plate 132 or the third support plate 133 disposed next is supported only by one spring 14, and as these structures are continuously disposed, a structure in which the battery packs can be sequentially seated may be configured.

Figure 2A:
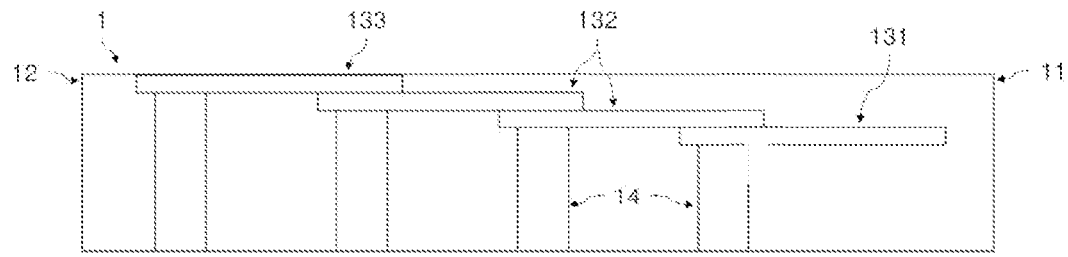
FIGS. 2A-2C are diagrams illustrating methods for operating a seating rail (support plate) of the mobile ESS device in accordance with the embodiment of the present invention.

FIG. 2A illustrates a state in which the battery pack is not seated in any of the seating grooves. In this state, when the first battery pack is inserted and moved to the right through the insertion port 12 on the left based on the drawing, since each of the third support plate 133 and the second support plates 132 is supported by the two springs 14 during the movement of the battery pack, the third support plate 133 and the second support plates 132 are not (almost) compressed, and accordingly, the battery pack can be smoothly moved to the first support plate 131 which is on the rightmost side.

Figure 2B:
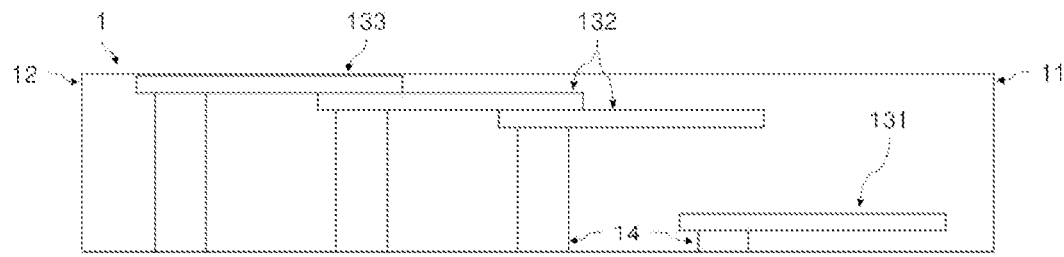
Figure 2C:
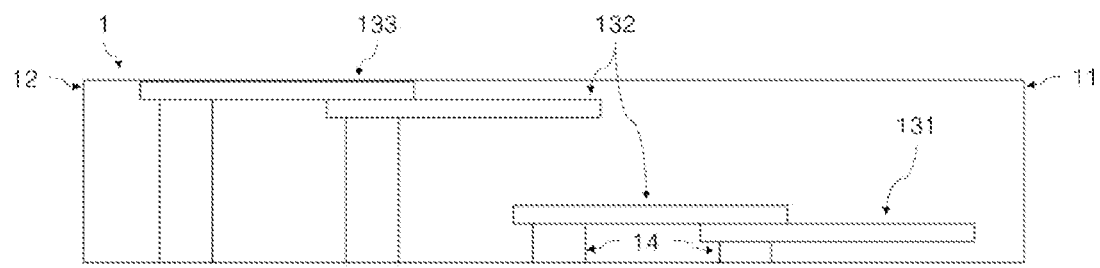
Figure 3:
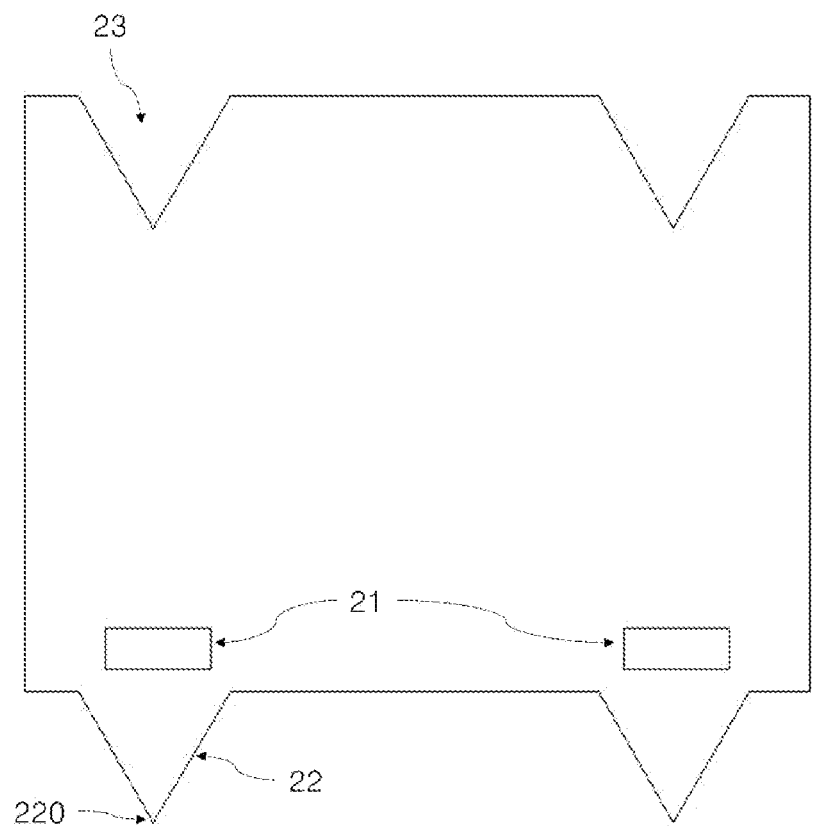
FIG. 3 is a diagram illustrating a battery pack case of the mobile ESS device in accordance with the embodiment.
Figure 4:
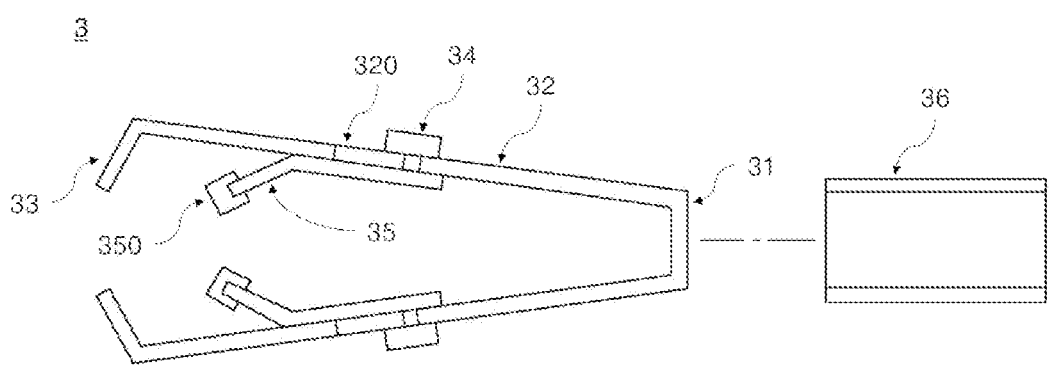
FIG. 4 is a diagram illustrating a hook of the mobile ESS device in accordance with the embodiment.

After the battery pack is moved to the first support plate 131, the spring 14 is compressed by the battery pack's own weight, and the battery pack is seated in the seating groove (FIG. 2B).

After that, when the second battery pack is inserted through the insertion port 12 and moved to the right, each of the third support plate 133 and the second support plates 132 is supported by the two springs 14 during the movement of the battery pack, the third support plate 133 and the second support plates 132 are not (almost) compressed, and accordingly, the battery pack can be smoothly moved to the rightmost second support plate 132 among the second support plates 132. The spring 14 connected to the rightmost second support plate 132 is compressed by second battery pack's own weight, and accordingly, the second battery pack is seated in the seating groove of the corresponding position.

In this case, the second connection part described above may be connected to or included in the support plate.

Further, the battery pack case includes a pair of fork rails 21 which is formed under the guide rail 1, extends in a direction parallel to the guide rail 1, and into which a fork of a forklift is able to be inserted, a seating guide projection 22 formed under the fork rail 21, protruding downward in a 'V' shape, and extending in a direction parallel to the fork rail 21, and a first seating guide groove 23 formed on an upper portion of the battery pack case and formed in a shape corresponding to the seating guide projection 22 to provide a space in which the seating guide projection 22 is seated when the battery pack case is stacked in two or more layers, and the battery pack case is configured such that when the seating guide projection 22 is seated in a second seating guide groove formed on a loading table of the moving means, a third connection part 220 of the battery pack case and a fourth connection part of the moving means are electrically connected, and the third connection part 220 is formed at a tip portion of the 'V' shape of the seating guide projection 22, and the fourth connection part is formed on a valley portion of a 'V' shape of the second seating guide groove.

The fork rail 21 is provided so that the battery pack case can be easily transported by equipment such as a forklift.

By transporting the battery pack case at once using a forklift, multiple battery packs can be handled at once.

The seating guide projection 22 and the seating guide groove may be provided to correct the inaccuracy of loading/stacking a heavy object using a forklift.

Although forklifts are difficult to load/stack heavy objects in precise/fine positions due to the characteristics of hydraulic equipment, according to the structure as described above, even if the battery pack case is put down at an appropriate position, the position of the battery pack cases or between the battery pack case and the moving means is naturally corrected by the V-shaped protrusion and groove, and the battery pack cases can be loaded/stacked.

The battery pack case whose position has been corrected can be electrically connected by the third connection part 220 and the fourth connection part.

Further, the moving jig includes a hook 3 configured to be detachably attached to a belt connection hole formed on one side of the battery pack and fastened to the transportation equipment, and a belt of which one end is connected to the hook 3 and which extends, and the hook 3 includes a branching part 31 that is bifurcated and spreads by its own elasticity, a fitting ring 36 fitted to the branching part so that the branching part 31 is closed to surround the handle bar, an elastic body 32 extending from the branching part 31, external tongs 33 at end portions of the elastic body 32 to surround the handle bar, a rail part 320 formed so as to be penetrated through the elastic body 32 to have a predetermined length, a slide part 34 connected to the rail part 320 so as to be slidably movable, internal tongs 35 connected to the slide part 34 to slide in the longitudinal direction of the elastic body 32, and a pair of magnets 350 that have different poles and are coupled to end portions of the inner tongs 35 so that attractive forces act.

The general hooks 3 are configured to be easily hung on one side of equipment such as a forklift by having one side thereof open in a 'U' shape.

However, according to the configuration of the hook 3, there is a possibility that the hook 3 may be removed from the equipment when tension is weakened.

In order to prevent this, a configuration in which, by cupping the outer tongs 33 through the fitting ring 36 as described above and transforming them into a ring shape and the inner tongs 35 are cupped by the magnets 350, may be adopted so that removal of the hook 3 can be prevented.

According to the configuration described above, both fastening and removal of the hook 3 are easy, and unintentional removal can be effectively prevented.

When the elastic body 32 is pressed by inserting and fitting the fitting ring 36 from the branching part 31, the external tongs 33 are cupped to form a predetermined closed curve, the slide part 34 is pushed forward of the rail part 320 by the fitting ring 36 and the inner tongs are also cupped, and the magnet 350 joins each other to form two closed curves is formed, and thus a fixed part of the equipment is accommodated inside the closed curve.

Although the embodiments of the present invention have been described in more detail with reference to the accompanying drawings, the present invention is not necessarily limited to these embodiments, and various modifications may be made within the scope without departing from the technical spirit of the present invention. Accordingly, the embodiments disclosed in the present invention are not intended to limit the technical idea of the present invention, but to explain. The scope of the technical idea of the present invention is not limited by these embodiments. Therefore, it should be understood that the embodiments described above are illustrative in all respects and not restrictive. The scope of protection of the present invention should be interpreted by the following claims, and all technical ideas within the scope equivalent thereto should be construed as being included in the scope of rights of the present invention.

Therefore, other implementations, other embodiments, and equivalents to the claims are also within the scope of the following claims.

According to one embodiment, the efficiency of the ESS linked with the moving means can be improved by controlling the battery pack using the movement information such as the speed of the vehicle, the front camera, and the current position, etc. of the moving means and sensing information such as acceleration of the moving means.

In addition, by linking the battery pack of the ESS and the battery of the moving means, power can be managed more efficiently.

Further, by configuring the battery pack, the battery pack case, etc. to be detachable according to a predetermined structure, the time required for detachment, maintenance, charging, replacement, etc. of the battery pack and the battery pack case can be reduced, and the battery packs can be more stably fixed.

Although the mobile ESS device has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A mobile energy storage system (ESS) device comprising:
   battery pack case electrically connected to a control device of a moving means and installed in the moving means;
   at least one battery pack accommodated in the at least one battery pack case and electrically connected to the battery pack case;
   at least one sensor module disposed in the at least one battery pack and the battery pack case to sense an electrical state and an environmental state of the at least one battery pack; and
   a controller accommodated in the battery pack case and electrically connected to the sensor module and the at least one battery pack and programmed to monitor and control the electrical state of the at least one battery pack,
   wherein the controller is further programmed to receive movement information related to movement from the control device of the moving means, control the sensor module based on the reception of the movement information, and control the at least one battery pack using the movement information and sensing information sensed by the sensor module, wherein the controller, by using the movement information and the sensed information, is further programmed to control the at least one battery pack so that power of the at least one battery pack is supplied to the moving means, control the battery of the moving means so that power of the battery of the moving means is supplied to the at least one battery pack, or control the battery of the moving means and the at least one battery pack so that the power of the battery of the moving means and the power of the at least one battery pack are supplied to an external device, and wherein, the battery pack case further comprises:

a door configured to open and close;

an insertion port disposed at one end of the battery pack case and configured to be open so that the at least one battery pack is removably insertable into the battery pack case;

a blocking wall formed at the other end of the battery pack case and configured to be closed so that the at least one battery pack is blocked at the other end of the battery pack case;

a plurality of support plates disposed in the battery pack case and configured to be movable up and down; and a plurality of springs disposed in the battery pack case, wherein each of the plurality of springs is connected to a lower portion of each of the plurality of support plates, wherein the plurality of support plates comprises:

a first support plate closest to the blocking wall;

a third support plate closest to the insertion port; and at least one second support plate disposed between the first support plate and the third support plate, wherein, parts of the first support plate, the at least one second support plate and the third support plate are sequentially stacked one by one in an order from the first support plate to the third support plate, wherein the parts of the first support plate, the at least one second support plate and the third support plate are stacked in a direction that each of the plurality of support plates is compressed with the each of the plurality of springs, and wherein at least one of the plurality of springs is connected to a lower portion of each of the parts of the first support plate, the at least one second support plate and the third support plate, which are stacked in the direction that each of the plurality of support plates is compressed with the each of the plurality of springs.

* * * * *